UNITED STATES PATENT OFFICE.

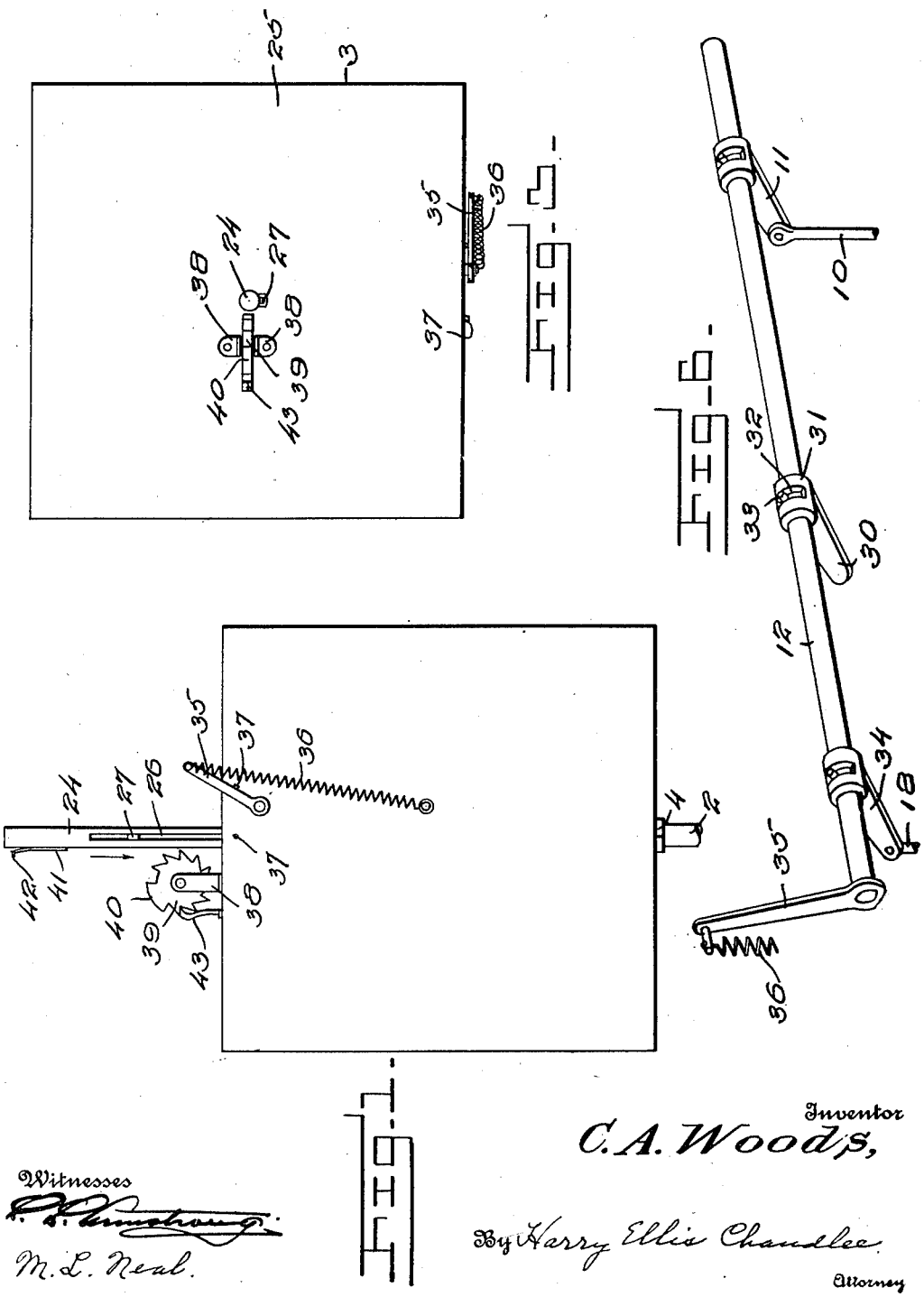

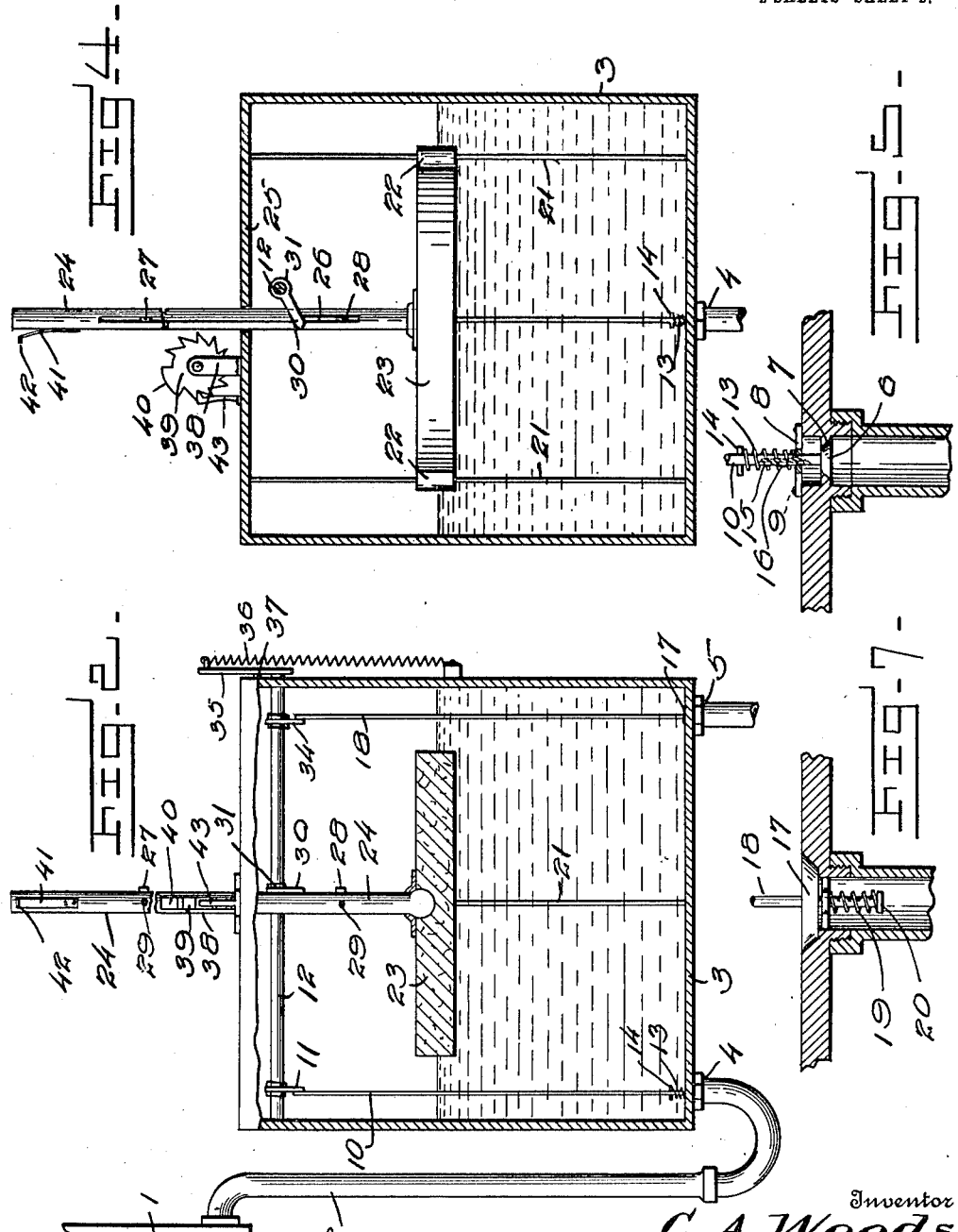

CLIFFORD A. WOODS, OF PLANKINTON, SOUTH DAKOTA.

AUTOMATIC MEASURING DEVICE.

1,018,598.      Specification of Letters Patent.      Patented Feb. 27, 1912.

Application filed March 18, 1911. Serial No. 615,219.

*To all whom it may concern:*

Be it known that I, CLIFFORD A. WOODS, a citizen of the United States, residing at Plankinton, in the county of Aurora and State of South Dakota, have invented certain new and useful Improvements in Automatic Measuring Devices, of which the following is a specification.

My invention relates to improvements in automatic measuring devices and has for its leading object the provision of an improved liquid dispensing apparatus which will automatically deliver a predetermined quantity of liquid and will register the amount so delivered.

A further object of the invention is the provision of an improved liquid dispensing apparatus, which can be quickly and readily set to deliver a predetermined quantity or desired multiple of said quantity and which will automatically shut off the supply of liquid at the termination of the delivery of the quantity for which it is set.

Other objects of my invention will be perceived from the following description taken in connection with the drawings and it will be understood that I may make any modification in the construction lying within the scope of my claims without departing from or exceeding the spirit of my invention.

Figure 1 represents a side elevation of my complete device. Fig. 2 represents a vertical sectional view thereof. Fig. 3 represents a top plan view. Fig. 4 represents a vertical sectional view in a plane at right angles to that of Fig. 2. Fig. 5 represents a detail view of one of the valves, Fig. 6 represents a perspective view of the float rod and rock shaft operating means, and Fig. 7 represents a detailed view of the outlet valve.

In the drawings, the numeral 1 designates a supply tank of my apparatus from which leads the pipe 2 to the tank 3 which is provided with my automatic measuring mechanism. Said tank 3 has the inlet port 4 and the outlet port 5, while controlling the port 4 is the valve 6 adapted to seat against the portion 7 of the tank 3, while extending across the inlet port 4 is the bar 8 having a central aperture 9 through which passes the valve rod 10 having one end secured to the valve 6 and having its other end pivoted to the rock arm 11 of the rock shaft 12. To normally hold the valve 6 closed I mount on the valve rod the helical spring 13 having one end bearing against the bar 8 and the other against the abutment 14 of the valve rod. To aid in holding the valve open I secure in the slot 15 formed in the side of the valve rod the curved blade spring 16 adapted to project from the slot and engage the under side of the bar 8 when the valve is open but being forced inward or cammed out of said locking position by the forcible shifting of the valve rod 10, as will be best understood by reference to Fig. 5.

Controlling the outlet port 5 is a valve 17 similar to the valve 6 and having a valve rod 18 secured thereto, said valve however, operating in the opposite direction from the valve 6 and having its helical spring 19 bearing directly against the valve and against the cross bar 20 to normally hold the outlet valve in closed position.

Secured within the receptacle 3 is a pair of guides 21 engaged by the laterally projecting lugs 22 of the float member 23 which has the float rod 24 secured thereto and rising therefrom through the top 25 of said receptacle 3. Said float rod, as best shown in Fig. 4 has a longitudinal slot 26 formed therein in which is mounted an upper abutment block 27 and a lower abutment block 28, said blocks being retained in adjusted position in the slot by the set screws 29.

In the operation of my device when the tank is empty the float 23 will descend to the bottom of said tank, and as the float so descends its block 27 will come into contact with the arm 30 projecting from the collar 31 which is mounted upon the rock shaft 12. The collar 31 has formed in one side a slot 32 in which moves the abutment pin 33 which limits the independent movement of the arm on the rock shaft. The continued downward movement of the float will cause the block 27 to engage the arm 30 and move it around the shaft, until it engages abutment pin 33 and rocks the shaft, the rocking movement of the shaft shifting the operating arm 34 of the valve rod 18 to press downward and close the valve 17 while shifting the arm 11 and thus the rod 10 to move the valve 6 and open the inlet port 4. As the tank or receptacle 3 is filled through said inlet port the float 23 will rise and in its upward movement the block 28 of the float rod will engage the arm 30 to rock first said arm and then the arm and shaft 12 in a reverse direction to that when the float falls, to close the valve 6 and open the valve 17 to permit the contents of the receptacle 3 to pass out through the port 5.

To prevent the rock shaft 12 from getting on a dead center and thus failing to entirely operate either of the valves, I secure to the outer end of said valve rod the lever arm 35 to which is secured one end of the spring 36 having its other end secured to the receptacle. Upon the rocking of the shaft when the float has reached almost its limit of movement in either direction the arm 35 will be moved just past the vertical central position, when the force of the spring will suffice to throw the arm 35 until it engages one of the abutments 37, the movement imparted to the shaft 12 through the arm 35 and its spring, completely closing one of the valves and opening the other.

From the foregoing description taken in connection with the drawings the construction and operation of my improved dispensing apparatus will be readily understood. To prevent the continuous operation of my device and cause the same to automatically cease its operation upon the delivery of a predetermined quantity of fluid, I support on the top of the receptacle by the brackets 38 the star wheel 39 having the circular sector shaped member 40 located at one point thereof. Secured to the side of the float rod adjacent the star wheel is the spring member 41 having a hooked end 42, and in operation the spring member 41 rides idly over the adjacent point of the wheel as the float ascends but on its downward movement the member 41 engages the upper side of the point to rotate the wheel one step, there being a pawl 43 engaging the star wheel to prevent its movement in a reverse direction. It will thus be seen that when the star wheel is set at a certain point it will rotate partially upon each reciprocating movement of the float and will thus register the number of movements of the float and thus the amount of fluid discharged through the receptacle 3. When, however, the wheel reaches a position where the spring member 41 contacts with the segment 40 in its downward movement the upwardly projecting point or corner of the segment will engage the hook 42 of the member 41 and prevent the descent of the float, thus locking the outlet valve in open and the inlet valve in closed position, the predetermined number of times which the device was set to deliver the fluid having been reached. It will further be observed that by adjustment of the blocks 27 and 28 through the screws 29 I may regulate the amount of movement of the float necessary to operate the rock shaft and thus the amount of liquid discharged from the receptacle upon each reciprocal movement of the float.

I claim:

1. A measuring device, comprising a supply tank, a supplemental measuring tank, a pipe connecting said tanks, an inlet valve for controlling the admission of fluid from the supply tank, an outlet valve for controlling the discharge from the supplemental tank, a rock shaft journaled in the supplemental tank, a plurality of rock arms secured on said shaft, a valve rod pivoted to one of said arms and to the inlet valve for controlling the latter, a valve rod pivoted to another of the arms, and to the outlet valve for controlling the same, said valves operating in opposite directions, a float mounted in the supplemental tank, an arm mounted on the rock shaft and having a range of independent rotating movement thereon, continued movement of said arm in excess of said range rocking the shaft, abutments carried by the float rod for engaging said arm to rock the shaft, and a spring secured to one of the rock arms of the shaft, and to the supplemental tank to continue the rocking of the shaft initiated by the engagement of the float rod with the arm of the shaft.

2. A liquid measuring apparatus, comprising a receptacle having inlet and outlet ports, a source of supply connected with the inlet port, valves for controlling said ports, a rock shaft journaled in the receptacle, a plurality of rock arms secured on said shaft, connections between certain of the rock arms and the inlet and outlet valves for operating said valves to open the one and close the other upon the rocking of the shaft, a float mounted in the receptacle, a float rod secured to the float, connections between said rod and the rock shaft for rocking the shaft, and means for checking the movement of the float when a predetermined quantity of liquid has been measured.

3. A measuring apparatus comprising a receptacle, having inlet and outlet ports, inlet and outlet valves for controlling said ports, a rock shaft journaled in the receptacle, a plurality of rock arms secured on said shaft, connections between certain of the arms and the inlet and outlet valves to open one of the valves while closing the other, a float mounted in the receptacle, a float rod secured to the float, connections between said float rod and the rock shaft for rocking the shaft to operate the valves upon movement of the float, a wheel rotatably supported on the receptacle adjacent the float rod, said wheel having a plurality of single points and one sector shaped member, means carried by the float rod to engage the single points to rotate the wheel one step on each downward movement of the float, a pawl for preventing movement of the wheel in a reverse direction, and a locking device carried by the float rod to engage the sector shaped member and hold the float in elevated position.

In testimony whereof I affix my signature, in the presence of two witnesses.

CLIFFORD A. WOODS.

Witnesses:
E. R. DUNN,
W. T. LATHROP.

Copies of this patent may be obtained for five cents each, by addressing the "Commissioner of Patents, Washington, D. C."